US011055830B2

(12) United States Patent
Rhee et al.

(10) Patent No.: US 11,055,830 B2
(45) Date of Patent: Jul. 6, 2021

(54) RENDERING PROCESS AND SYSTEM

(71) Applicant: Victoria Link Limited, Wellington (NZ)

(72) Inventors: Tae Hyun Rhee, Wellington (NZ); Andrew Chalmers, Lower Hutt (NZ); Benjamin Peter Allen, Wellington (NZ); Thomas Manu Iorns, Porirua (NZ); Lohit Dev Petikam, Wellington (NZ)

(73) Assignee: Victoria Link Limited, Wellington (NZ)

(*) Notice: Subject to any disclaimer, the term of this patent is extended or adjusted under 35 U.S.C. 154(b) by 0 days.

(21) Appl. No.: 16/345,927

(22) PCT Filed: Nov. 22, 2016

(86) PCT No.: PCT/AU2016/051137
§ 371 (c)(1),
(2) Date: Apr. 29, 2019

(87) PCT Pub. No.: WO2018/076038
PCT Pub. Date: May 3, 2018

(65) Prior Publication Data
US 2019/0272626 A1 Sep. 5, 2019

(30) Foreign Application Priority Data

Oct. 31, 2016 (AU) .................................. 2016904448

(51) Int. Cl.
*G06T 15/20* (2011.01)
*G06T 5/00* (2006.01)
(Continued)

(52) U.S. Cl.
CPC .............. *G06T 5/009* (2013.01); *G06T 15/20* (2013.01); *G06T 15/503* (2013.01);
(Continued)

(58) Field of Classification Search
CPC ....... G06T 5/009; G06T 15/20; G06T 15/506; G06T 15/55; G06T 15/60; G06T 2207/20208
See application file for complete search history.

(56) References Cited

U.S. PATENT DOCUMENTS 7,091,973 B1 * 8/2006 Cohen .................... G06T 15/50
345/426
8,619,082 B1 * 12/2013 Ciurea .................... G06T 15/20
345/427
(Continued)

OTHER PUBLICATIONS

Banterle et al., "Expanding Low Dynamic Range Videos for High Dynamic Range Applications," Proceedings of the 24th Spring Conference on Computer Graphics, Apr. 21, 2008, 8 pages.
International Search Report and Written Opinion dated Feb. 7, 2017, Patent Application No. PCT/AU2016/051137, filed Nov. 22, 2016, 12 pages.
(Continued)

*Primary Examiner* — Said Broome
(74) *Attorney, Agent, or Firm* — Davis Wright Tremaine LLP

(57) ABSTRACT

A rendering process and system that may be used to composite virtual objects in panoramic video to provide a virtual reality and augmented reality experience. The process includes receiving low dynamic range (LDR) video data, e.g. 360° video; generating radiance maps, such as diffuse and specular maps, from the LDR data; inverse tone mapping the LDR data of the maps to generate high dynamic range (HDR) data for the maps; and receiving at least one virtual object and applying image based lighting (IBL) to the virtual object using the HDR data of the maps. A perceptually based threshold is also applied to radiance maps to detect prominent pixels, and using the prominent pixels as salient lights for image based shadowing (IBS) associated the virtual object. Objects are composited 360° video in real time using IBL and IBS without precomputation allowing user interaction with the objects.

18 Claims, 13 Drawing Sheets

(51) Int. Cl.
*G06T 15/50* (2011.01)
*G06T 15/55* (2011.01)
*G06T 15/60* (2006.01)
*H04N 5/232* (2006.01)

(52) U.S. Cl.
CPC ............ *G06T 15/506* (2013.01); *G06T 15/55* (2013.01); *G06T 15/60* (2013.01); *H04N 5/23238* (2013.01); *G06T 2207/20208* (2013.01)

(56) References Cited

U.S. PATENT DOCUMENTS

2009/0304298 A1* 12/2009 Lu ............................ G06T 9/00
  382/251
2012/0201456 A1* 8/2012 El-Mahdy ............... G06T 5/009
  382/167

OTHER PUBLICATIONS

Iorns et al., "Real-Time Image Based Lighting for 360-Degree Panoramic Video," Revised Selected Papers of the PSIVT 2015 Workshops on Image and Video Technology, 9555:23-27, Nov. 25, 2015.

Iorns, "Real-Time Image Based Lighting for 360 Degree Panoramic Video," A thesis submitted to the Victoria University of Wellington in partial fulfilment of the requirements for the degree of Master of Science in Computer Science, Victoria University of Wellington, 2016, 104 pages.

Karsch et al., "Automatic scene inference for 3d object compositing," ACM Transactions on Graphics (TOG) 33 (3):32:1-15, Jun. 2, 2014.

Ma et al., "Synthesising Radiance Maps from Legacy Outdoor Photographs for Real-time IBL on HMDs," 2015 International Conference on Image and Vision Computing New Zealand (IVCNZ), Nov. 23, 2015, pages.

* cited by examiner (a)

(b)

(c)

(d)

(e)

(f)

RENDERING PROCESS AND SYSTEM

CROSS REFERENCE TO RELATED APPLICATIONS

This application is a 371 of International Application No. PCT/AU2016/051137, filed Nov. 22, 2016, which claims priority to Australian Patent Application No. 2016904448 (filed Oct. 31, 2016), each of which are hereby incorporated by reference in their entirety.

FIELD

The present invention relates to a rendering process and system that may be used to composite objects with panoramic video and provide a mixed reality experience for a user.

BACKGROUND

Stereographic head mounted displays (HMDs), such as the Oculus Rift, HTC Vive, and Sony PlayStation VR, and accompanying controllers are now available for use with a computer to provide a computer system that delivers a virtual reality (VR) experience for a user. By adding content to the rendered video presented to the user on the HMD, an augmented reality (AR) experience can also be delivered. Combining virtual reality and augmented reality allows a user to interact with augmented objects in a virtual environment. The environment may include computer generated images or a captured real-world video to provide an immersive video viewing experience. The computer system can then be considered to be delivering a mixed reality experience to a user wearing the HMD and operating the controllers.

Equipment, such as catadioptric omnidirectional camera or multiple-camera rigs, is now available to capture 360° panoramic video (i.e. video with a full spherical 4π steradian field of view) and when displayed on a HMD provides a user with a completely omnidirectional and immersive video viewing experience. Many 360° panoramic videos are available on video sharing and streaming web sites, such as YouTube and Facebook.

Whilst 360° videos provide for impressive natural and real world visuals, the current virtual reality computer systems only allow interaction limited to the head motion of the user.

A significant technical challenge is to provide a rendering process and system that can seamlessly composite virtual objects into live video, particularly 360° video (360-video). To provide an impressive immersive mixed reality experience, the process or system needs to deliver both high visual quality for seamless composition of objects and performance for real-time rendering. Image based lighting (IBL) techniques can be used to illuminate 3D objects, but the low dynamic range (LDR) data captured using conventional 360° video camera equipment does not provide the sufficient dynamic range for IBL. High performance rendering is also particularly important to mitigate against visual discomfort when using a HMD. Also in adapting a live video stream, or even a synthetic computer generated video, and providing interaction with composited virtual objects, a rendering process that requires precomputation cannot be used.

Accordingly, it is desired to address the above or at least provide a useful alternative.

SUMMARY

An embodiment of the present invention provides a rendering process including:

receiving low dynamic range (LDR) video data;
generating radiance maps from said LDR data;
inverse tone mapping LDR data of said maps to generate high dynamic range (HDR) data for said maps; and
receiving at least one virtual object and applying image based lighting to said at least one virtual object using said maps.

The maps may be diffuse and specular maps.

An embodiment of the present invention also provides a rendering process applying a perceptually based threshold for image based shadowing (IBS). Salient lights may be detected from the LDR video data and used to provide realistic shadows for real-time differential rendering.

Advantageously, the rendering process may also use the LDR video data as a background for differential rendering to composite said at least one virtual object into the background.

Advantageously, the rendering process may include applying a dynamic perceptual based threshold to detect prominent pixels; and converting said prominent pixels into directional lights for image based shadowing associated with at least one virtual object. The prominent pixels for salient lights may detected from the LDR video data, HDR video, or inverse tone mapped LDR video data to provide realistic shadows for real-time differential rendering.

An embodiment of the invention also provides a rendering computer system including:

a head mounted display;
a graphics processing unit (GPU);
a computer processing unit (CPU); and
processing modules including GPU shaders to provide a pipeline to perform the rendering process.

DRAWINGS

Embodiments of the present invention are described herein, by way of example only, with reference to the accompanying drawings wherein.

DESCRIPTION

Figure 1:
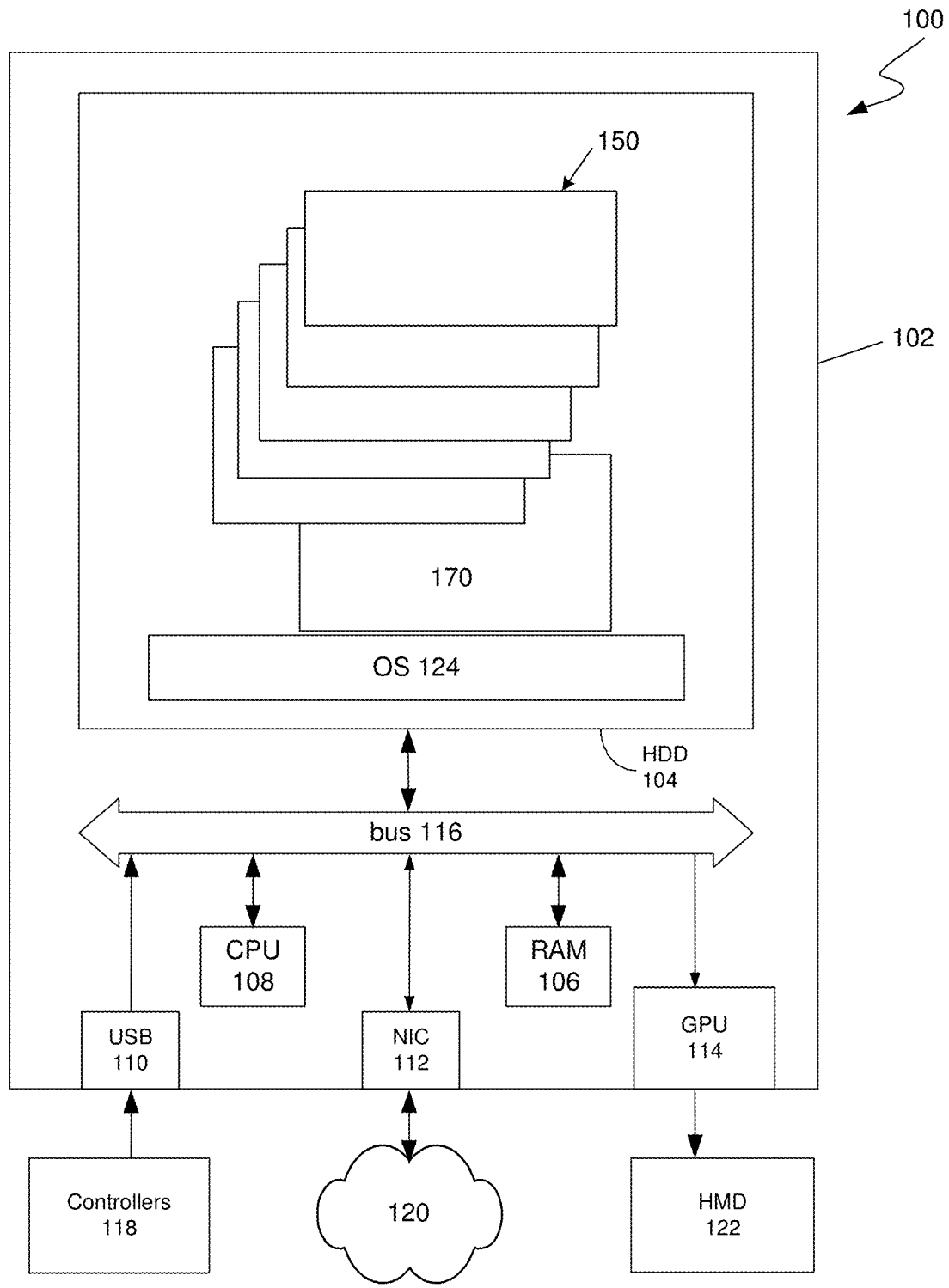
FIG. 1 is a block diagram of an embodiment of a rendering system according to the present invention.
Figure 2:
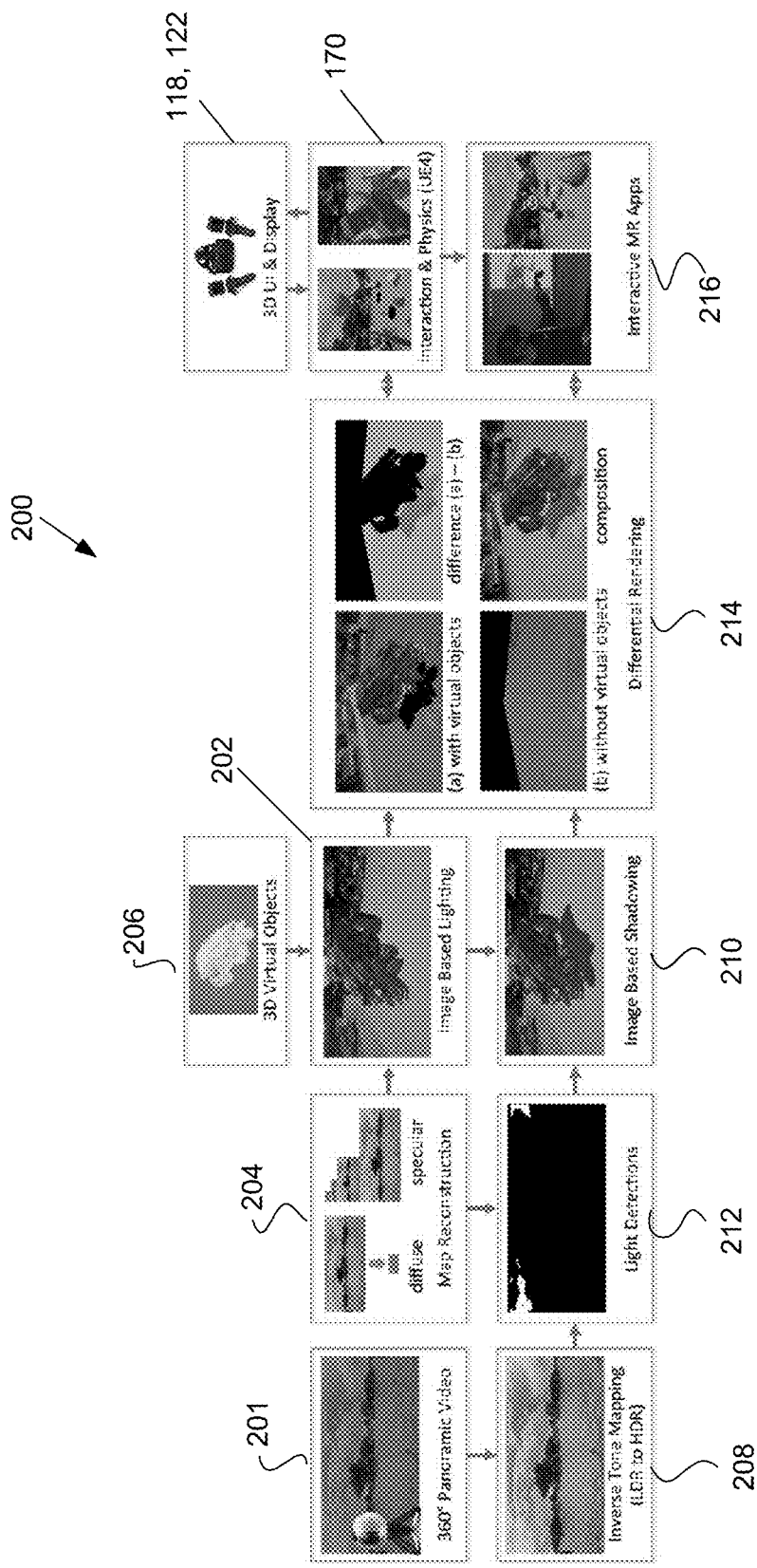
FIG. 2 is a diagram of an embodiment of a rendering process according to the present invention.

A rendering computer system 100, as shown in FIG. 1, is an exemplary embodiment of a mixed reality system that executes a rendering process 200, as shown in FIG. 2. The rendering computer system 100 is herein referred to as MR360. The rendering process provides a processing pipeline to allow users of the system 100 to interact with 360° videos containing three dimensional (3D) virtual objects seamlessly augmented into a panoramic 360-video. The rendering process can also be used to seamlessly augment the objects into a computer generated or synthetic video.

The rendering computer system 100 includes a computer 102, such as an Intel architecture computer produced by Lenovo Corporation, IBM Corporation or Apple Inc. The data processing executed by the computer system 102 is defined and controlled by computer program instruction code and data of software components or modules 150 stored on non-volatile (e.g. hard disk) storage 104 of the computer 102. The modules 150 include a game engine 170 and GPU shaders that can be integrated into the game engine or run separately. The processes performed by the modules 150 can, alternatively, be performed by firmware stored in read only memory (ROM) or at least in part by dedicated hardware circuits of the computer 102, such as application specific integrated circuits (ASICs) and/or field programmable gate arrays (FPGAs). These integrated circuits can be part of a display adapter 114 and execute processes of the rendering pipeline.

The computer 102 includes random access memory (RAM) 106, at least one microprocessor (CPU) 108, and external interfaces 110, 112, 114 that are all connected by a system bus 116. The external interfaces include at least universal serial bus (USB) interfaces 110, a network interface connector (NIC) 112, and the display adapter 114. Other interfaces, such as Bluetooth and Wifi interfaces can also be included. The USB interfaces 110 are connected to input/output devices, such as VR hand controllers, a keyboard and/or mouse 118. The display adapter 114 is connected to a Head Mounted Display (HMD) 122, such as the Oculus Rift, HTC Vive, or Sony PlayStation VR. The display adapter 114 includes a graphics processing unit (GPU) to support and execute the rendering pipeline. The NIC 112 enables the computer 102 to connect to a communications network 120. The network 120 may include one or a combination of existing networks, such as a LAN, private WAN, the PSTN, the Internet, mobile cellular telephone networks, etc. The computer 102 includes an operating system (OS) 124, such as Microsoft Windows, Mac OSX or Linux. The modules 150 can run on the OS 124, and include program code written using languages such as C, C++, Ruby or C# or the language supported by the framework provided by the game engine 170.

For example, the system 100 can have a computer 102 with an Intel Xeon 3.5 GHz CPU 108, 8 GB memory 106, and an Nvidia Geforce GTX 970 GPU 114. The HMD 122 can be a HTC Vive VR headset (HTC headset) supporting display at 90 FPS with HTC Vive hand-held controllers (HTC controller) 118 for user interactions. The MR360 rendering pipeline 200 can be implemented by GPU shaders and/or one or more software programs that run on the CPU 108 directly. The pipeline 200 is integrated into a 3D game engine 170 such as Unreal Engine 4 (UE4) or Unity with a light detection process 212 of the pipeline 200 for image based shadowing (IBS) running on the CPU 108 concurrently.

MR360, as described herein, provides realistic illumination of 3D virtual objects using a LDR 360-video as the light source as well as the backdrop for real world backgrounds, and presents high visual quality and rendering speed.

The system 100 uses perceptually based thresholding for real time image based shadowing (IBS). Salient lights are detected from the 360-video providing optimal realistic shadows for real-time differential rendering.

MR360 does not require any pre-computation, and therefore allows a rich user interaction that is beyond the scope of conventional 360-videos; e.g. manipulating dynamic objects within a live 360-video stream in varying lighting conditions.

Compared with full 3D rendering, MR 360 provides better rendering performance because the complex background can be pre-rendered, such as a previously stored 360-video or synthetic video, and in real-time rendering the pipeline focuses on rendering the augmented virtual objects and thereby allows the computing power of the GPU 114 to focus on those objects.

Real-Time IBL Using 360-Video

An image based lighting (IBL) process 202 of the pipeline supports photorealistic rendering of virtual objects using real-world lighting.

Perceptually Based IBL

MR360 receives LDR 360-video 201 as an input stream and dynamic real-world radiance maps 204 are generated to illuminate virtual objects. Since lighting and materials are reciprocal in illumination, radiance maps are reconstructed to represent illumination of diffuse, glossy, and mirror-like specular materials.

Figure 3:
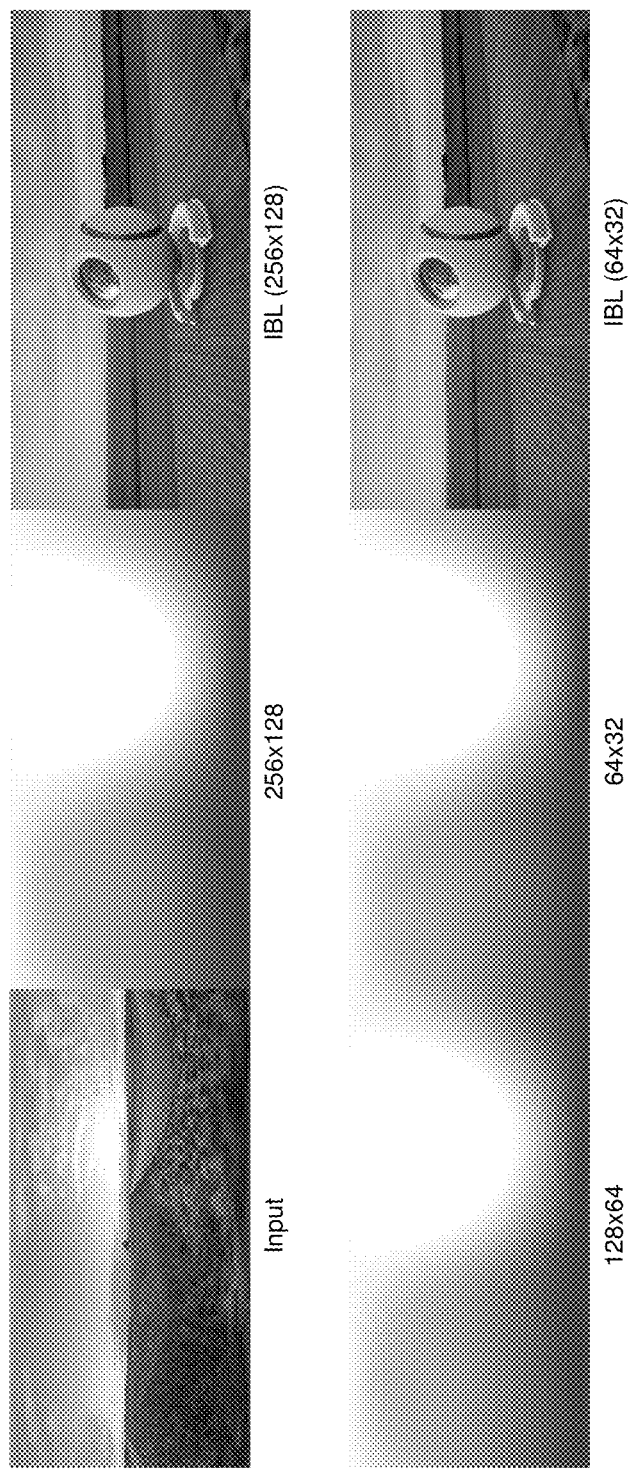
FIG. 3 is an image comparison of IBL rendering using diffuse radiance maps of various resolutions.

For diffuse illumination, a diffuse radiance map is generated per frame. When using a perceptually optimised radiance map, reducing the resolution for a tiny radiance map (e.g. 32×16 pixels), reduces the computation cost to generate the diffuse map per frame while maintaining the perceptible visual quality for IBL as shown in FIG. 3. Once the diffuse radiance map for each frame is generated, the diffuse lighting for any point on a composite object's surface consists of a single texture lookup by using the pixel position to look up a texture value from the map.

Mirror-like specular reflection can be achieved by environment mapping, but glossy specular reflection is usually computationally expensive. MR360 approximates glossy specular reflection with mipmaps in a similar manner to the diffuse illumination. The sampling radius around the specular direction depends on a surface roughness parameter related to the glossy lobe. In a radius around the specular direction, MR360 samples a mipmap chain of specular radiance maps at an appropriate level, for example, a higher resolution mipmap level is sampled for lower roughness. Glossy specular lighting is approximated using a fixed number of texture lookups per rendering fragment. The pipeline 200 uses 18 samples for inside, and 18 samples for outside the primary glossy lobe.

Figure 4:
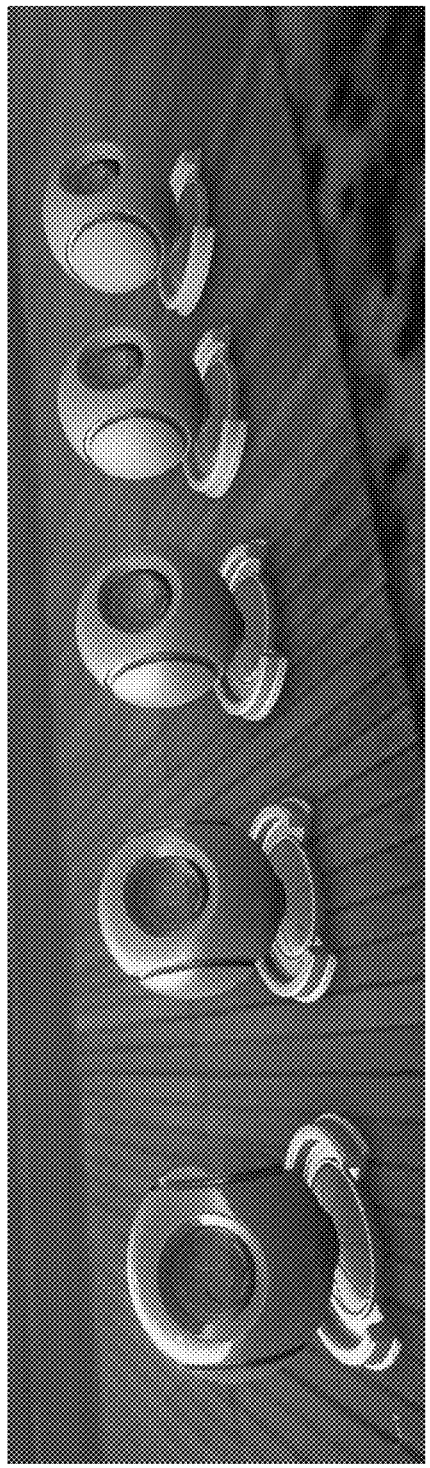
FIG. 4 is a glossy specular reflection image with various roughness parameters.

For the GPU 114 every 360-video frame is convolved by a GPU shader 150, which outputs 204 a diffuse radiance map and mipmaps for the specular radiance map to multiple render targets. The radiance maps 204 are then applied to IBL 202 for virtual objects 206 by sampling the radiance map render targets corresponding to proper material properties as shown in FIG. 4 and described further below. The maps 204 are used to effectively change material properties of the rendered objects during IBL processing 202 rather than actually varying the material properties of the objects themselves.

Inverse Tone Mapping from LDR to HDR

IBL 202 requires HDR radiance maps as the input for realistic illumination. Missing radiance values in LDR radiance maps cannot produce believable lighting in IBL. Inverse tone mapping can boost the radiance values of LDR radiance maps to provide believable IBL results targeting the human visual system. The MR60 pipeline applies inverse tone mapping 208 such that the HDR colour is calculated from the LDR colour as:

$$\langle R_o, G_o, B_o \rangle = k \cdot \langle R_i, G_i, B_i \rangle \tag{1}$$

$$k = 10 \cdot Y_i^{10} + 1.8 \tag{2}$$

The input luminance is calculated as:

$$Y_i = 0.3 \cdot R_i + 0.59 \cdot G_i + 0.11 \cdot B_i \tag{3}$$

The tone-mapping process 208 is independent of varying frame properties, and the same transform is applied to each pixel individually. As such it is easily and efficiently implemented on the GPU 114.

While GPU instructions are being queued, a separate thread loads and decodes the next video frame. This is passed to the GPU using a pixel buffer object for asynchronous memory transfer. As the target display refresh rate is much higher than typical video framerate (minimum 75 frames per second for HMD, typical 25 frames per second for video) one frame is used for display as the next is being loaded, giving smooth video performance.

The basic procedure code is described below for the processes 202, 204, 208. The diffuse radiance map is upscaled by texture filtering such as bilinear texture filtering. For the HMD the display process is executed twice, once for each eye.

```
Input             : LDR 360° video
Input             : 3D mesh data
Output            : LDR framebuffer texture for display
while program running do
    if time elapsed > 1 / video FPS then
        /* tonemap next frame to HDR texture   */
        for pixel ← video frame do
            pixel colour *= 10 * (pixel luminance)¹⁰ +
            1.8;
        end
        /* render diffuse radiance map         */
        for outpixel ← diffuse map do
            accumulator = 0;
            weight = 0;
            for inpixel ← low resolution specular map do
                inpixel area = cos (inpixel latitude);
                inpixel weight = inpixel area * angle
                between (inpixel, outpixel);
                accumulator += inpixel weight *
                environment colour (inpixel direction);
                weight += inpixel weight;
            end
            outpixel colour = accumulator / weight
        end
        reset elapsed time;
    end
    draw specular environment to output buffer as background;
    rasterize virtual objects into output buffer using IBL shader;
end
```

As mentioned, object lighting is performed in a GPU fragment shader 150. Specular and diffuse lighting consist of texture lookups into the specular and diffuse radiance maps. Glossy specular lighting uses a somewhat more complicated system of sampling in a fixed pattern from lower-resolution mipmap levels of the specular map. Samples are taken in concentric rings around the specular direction and which mipmap level to sample from is determined by taking the distance between samples in a ring, and choosing the level with an equivalent distance between pixels. Samples are weighted, and the radius of the glossy lobe is defined to be the distance at which the weighting is 0:5. To reduce discretization artifacts, hardware trilinear filtering is enabled.

IBL in Different Materials

Figure 5:
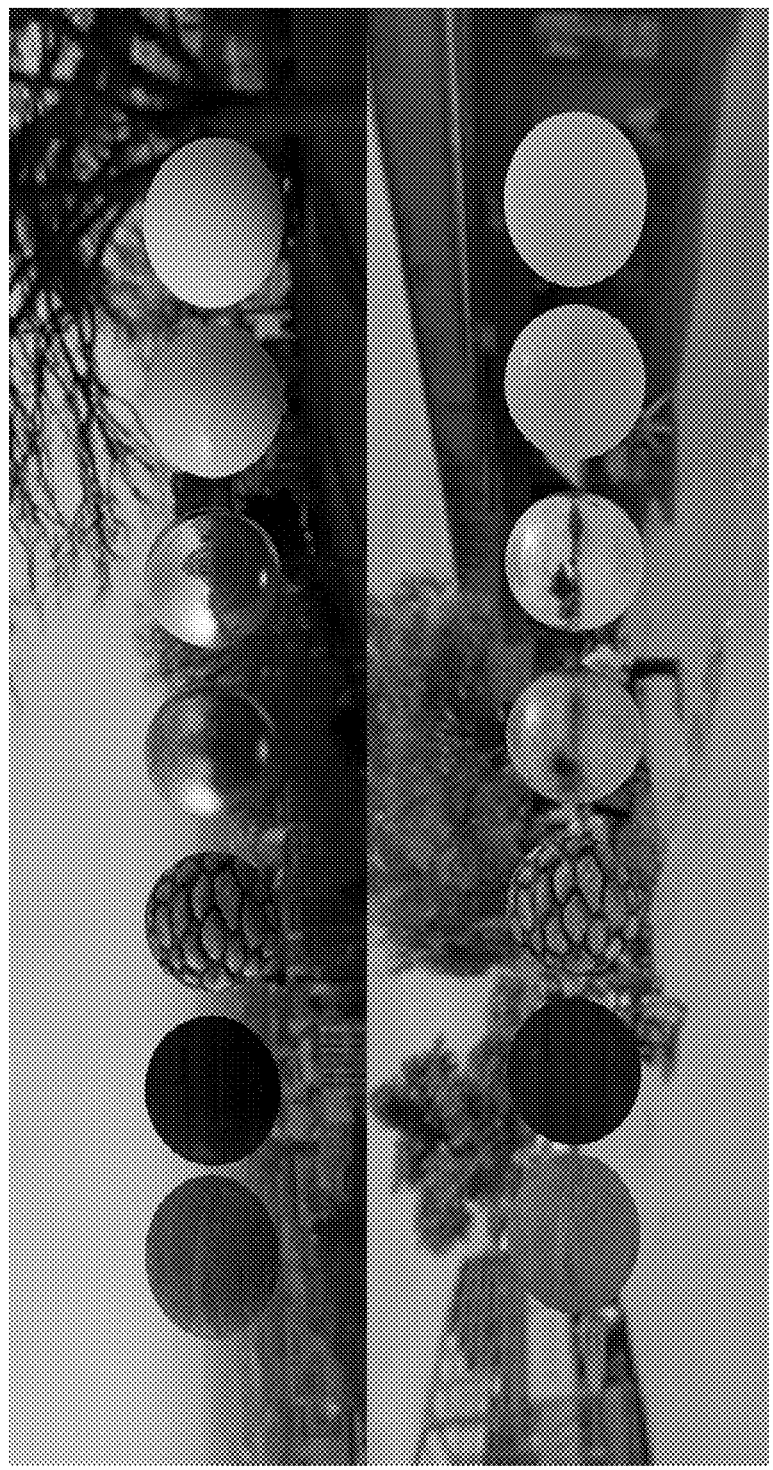
FIG. 5 is images rendered using real-time IBL integrated with various shading models in different 360-videos.

The IBL process 202 supports real-time rendering for various materials covering diffuse, glossy, and mirror-like specular reflection, and FIG. 5 shows the IBL produced using different UE4 shading models for two different 360-videos augmented with the same objects. The reconstructed LDR 360-videos using inverse tone-mapping provide believable IBL when viewed independently as shown in FIG. 5.

Real-Time IBS Using 360-Video

Light Detection

Real-time IBL provides realistic illumination but has limitations for casting realistic shadows. Studio artists in visual effects studios often add artificial lights, such as a directional light, on top of the radiance map. The process is automated in MR360 100 for real-time image based shadowing (IBS) 210.

Figure 6:
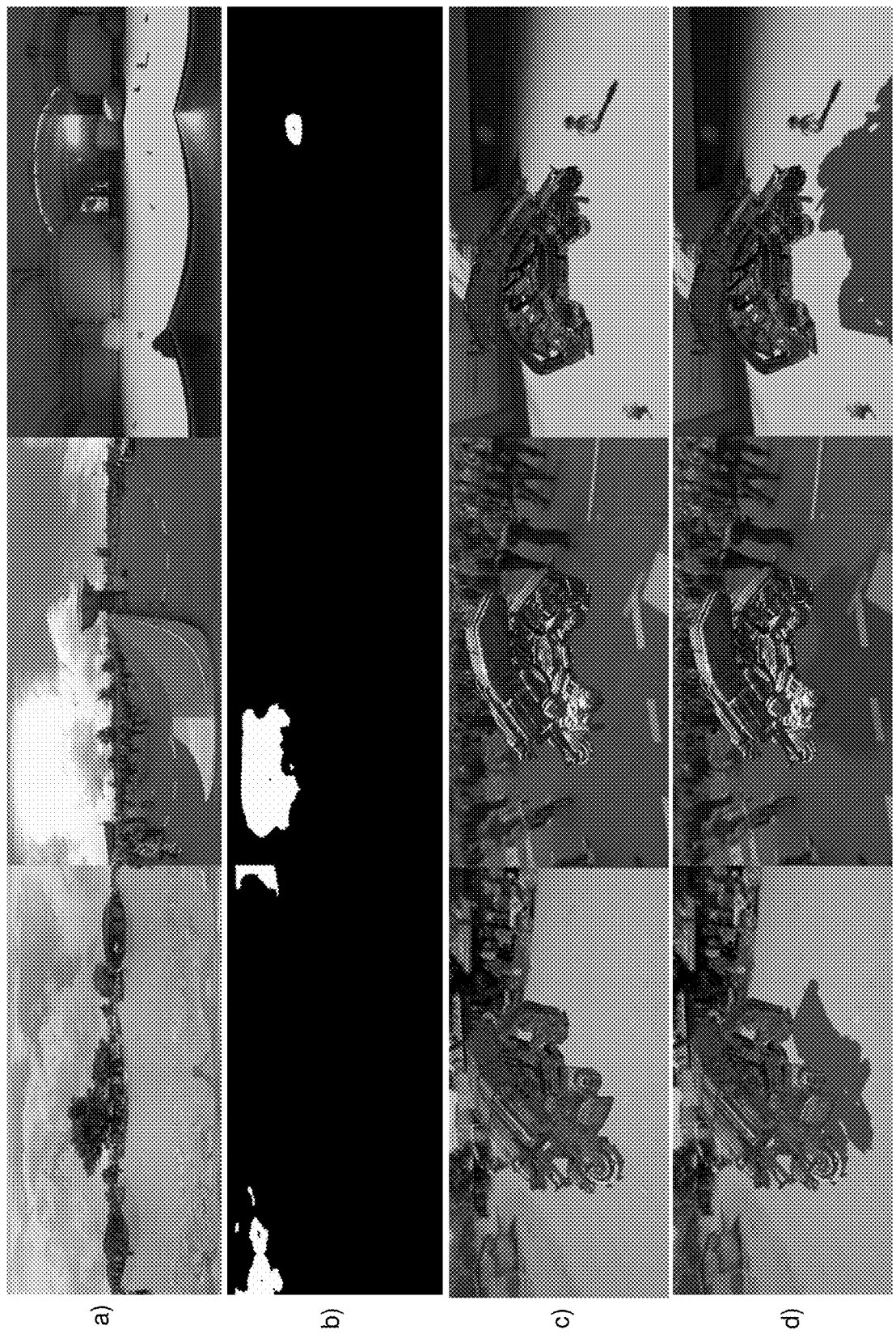
FIG. 6 is images illustrating light detection and includes input environment maps (a), light detection masks (b), rendered results with only IBL (c) and rendered results with IBS (d), and dots on the masks indicate the positions of the detected lights.
Figure 7:
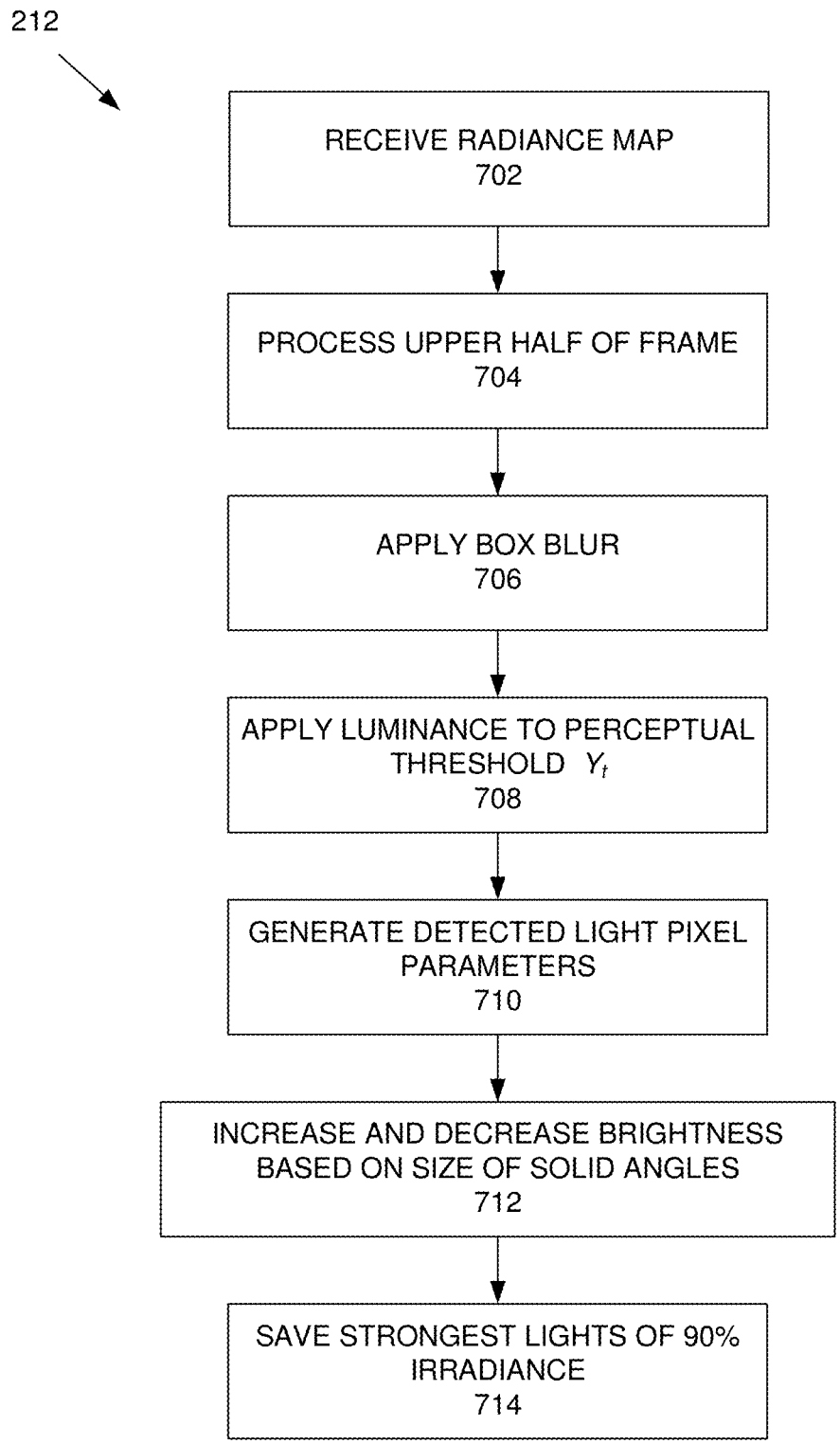
FIG. 7 is a flow diagram of the light detection process for image based shadowing (IBS)

Given a radiance map (step 702), MR360 detects prominent patches of pixels and convert them into directional lights 212, as shown in FIG. 7. Standard shadow mapping can then be used to cast shadows from detected lights in dynamic scenes. To allow for dynamic radiance maps, IBS needs to runs in real-time. To achieve this, the MR360 pipeline uses a thresholding approach. Given a threshold value, if a pixel's luminance (after inverse tone-mapping) is above the threshold, it is considered part of a light source. This produces a mask, as shown in FIG. 6(*b*) for which pixels belong to light sources. In order to produce a minimal set of discrete directional lights, a breadth-first search on this mask is performed to determine connectivity between pixels to find the area of lights. The threshold luminance is subtracted from each pixel before computing the light properties, and clamp the luminance of the pixels in the radiance map to the threshold luminance in order to ensure energy conservation (708).

For each detected light, the pipeline determines its properties or parameters (710) from the threshold luminance $Y_t$ and the pixels that belong to it in terms of their luminance $Y_p$, radiance $L_p$, solid angle $\Omega_p$ and spherical coordinates $\theta_p, \varnothing_p$. Each pixel's irradiance is determined from the amount of its radiance over the luminance threshold:

$$E_p = \Omega_p \cdot \left( L_p - L_p \cdot \min\left(1, \frac{Y_t}{Y_p}\right) \right) \tag{4}$$

The light's irradiance is then $E_l = \Sigma_{pixels} E_p$. The light's position in spherical coordinates is determined by a weighted mean where Y(E) is as for equation 3:

$$\langle \theta_l, \varnothing_l \rangle = \frac{1}{Y(E_l)} \sum_{pixels} Y(E_p) \cdot \langle \theta_p, \varnothing_p \rangle \tag{5}$$

This process can run in real-time once the following is addressed. Firstly, the actual threshold needs to be determined, and changes based on the radiance map. For example, a radiance map with a strong dominant light requires a high threshold value, but a radiance map with diffuse light sources requires a lower threshold value. For dynamic radiance maps used by MR360, the threshold value needs to change in real-time based on the current frame.

To calculate the dynamic threshold $Y_t$, it is determined statistically in terms of the distribution of luminance values. When the pipeline runs, the mean μ and variance $σ^2$ of each frame's luminance is determined and the threshold is generated based on these statistical metrics to ensure real-time performance. The threshold value used is:

$$μ+2σ \qquad (6)$$

A threshold value produces noisy patch areas, rather than a minimal number of contiguous patches but applying a small box blur (706) to the luminance data before thresholding successfully deals with the noise, and produces much cleaner patches. The light detection can produce a small number of strong lights together with a number of very weak lights whose luminance was only slightly over the threshold, and to address this, the lights are sorted in order of descending strength, and then only the first n lights are kept for the smallest value of n such that their combined irradiance is at least 90% of that from all detected lights (714).

In some scenarios a strong ground reflection may be erroneously detected as a light, potentially at the expense of a real light. MR360 is primarily directed to provide lighting from the upper hemisphere to cast shadows, so only the upper half of the frame to is processed to avoid strong ground reflections (704).

Due to the video 201 being LDR, lights can be clipped to plain white. While inverse tone-mapping 208 significantly improves this scenario, there is no a priori way to determine how bright the light was before clipping and this presents an issue when it comes to matching the strength of shadows visible in the video. Small light patches are more likely to be lights proper, while larger patches may be clouds or reflections. MR360 applies (712) a greater brightness increase to lights of smaller solid angles and reduces the brightness of those with very large solid angles. The solid angle of the light sources is determined, and this is used to control shadow filtering (using for example percentage closer filtering) to achieve perceptually acceptable artificial soft shadow penumbrae that vary dynamically with the environment. IBS 210 is achieved by applying the detected light parameters to a dynamic shadowing procedure of the game engine 170.

Perceptually Based Thresholding

While thresholding allows for real-time light detection, it has two potential issues. Firstly, the threshold value needs to be manually set as described above. Secondly, the threshold acts as a global value across the image, which may suggest that it is prone to noise. MR360 uses experimentally derived perceptually based thresholding which addresses both of these issues. The experiment produces a perceptually acceptable statistical rule for a threshold value.

In order to determine a threshold value, an optimization was performed between thresholding and a known method for light detection in LDR images that is considered perceptually acceptable to humans. For example, a known method is described in "Automatic scene inference for 3d object compositing", K. Karsch, K. Sunkavalli, S. Hadap, N. Carr, H. Jin, R. Fonte, M. Sittig, and D. Forsyth, ACM Trans. Graph., 33(3):32:1-32:15, June 2014. This method is able detect lights in images by using machine learning that has been trained using a manually labelled database of LDR images. A threshold value can then be determined which best matches the results produced by the known method. This in turn produces a statistical rule for the threshold value using statistical metrics. In order to find a general rule which is consistent among various lighting conditions, three broad categories of radiance maps are used: single hard light, single soft light, and multiple light. For each case, the known light detection method is run, which produces a binary mask of the light pixels. From this, a binary search is used to find an optimal threshold value. The binary search adjusts the threshold value such that a weighted sum of the active luminance values in the upper hemisphere of the radiance map is similar to that produced by a mask of the known method, where the error metric is:

$$\left| \left( \sum_{pixels_t} \Omega_p \cdot Y_p \right) - \left( \sum_{pixels_k} \Omega_p \cdot Y_p \right) \right| \qquad (7)$$

$Y_p$ is the pixel luminance and pixels and $pixels_k$ respectively denote the sets of pixels provided by the threshold mask and mask of the known method. From this it was determined a threshold value of approximately 2 standard deviations above the mean captures the necessary lighting conditions, as specified by equation 6. The use of this threshold results in the pipeline producing images with lighting that is considered perceptually acceptable to humans.

Differential Rendering for 360-Video

Figure 8:
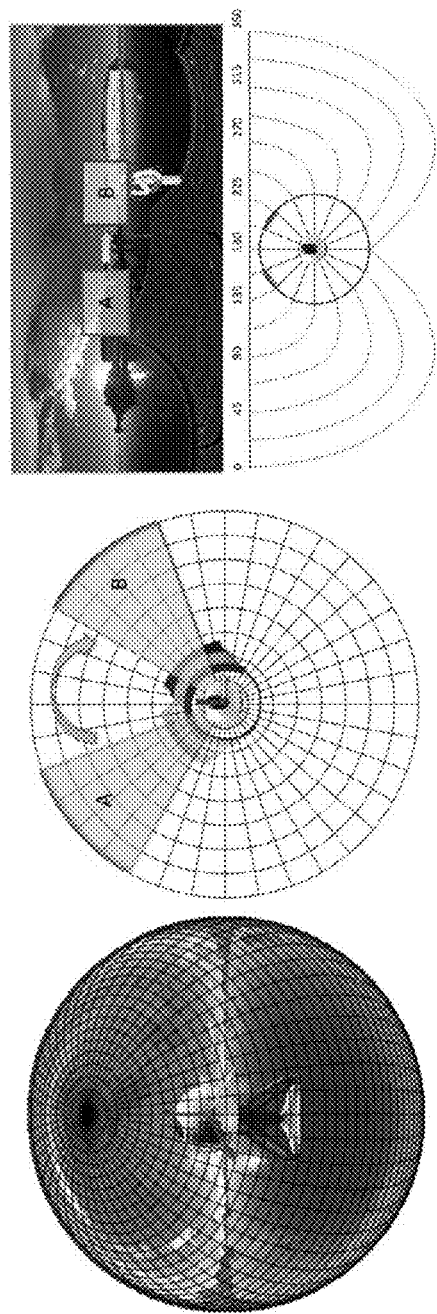
FIG. 8 is a diagram of view changes in 360-video using a HMD.

In typical 360-video viewing scenarios using a HMD 122, a user's head rotations tracked by the sensor of the HMD 122 will be mapped to a virtual camera centred at the spherical coordinates of the 360-video. Then, the virtual camera will project a part of 360-video into the HMD screen as shown in FIG. 8. It provides the immersive illusion that the users view is navigating the surrounding 360° panoramic environment. In a general capturing setup for 360° panoramic videos, the camera is located at the origin of the spherical coordinates mapping the panoramic scene. If the camera is in a fixed position, or camera and virtual objects move together while maintaining relative position between them, the virtual objects will be in the same position at the camera coordinates in every frame of the 360-video. Since the HMD viewer's position will be in the camera origin when viewing the 360-video, the position of the virtual objects will be the same in every frame when rotating the head, and therefore sophisticated camera tracking is not actually required for differential rendering with 360-video as the backdrop.

Figure 9:
FIG. 9 is images produced by the compositing steps of real-time differential rendering of the process and includes (a) 360 background (user's view), (b) background, objects and local scene, (c) local scene without objects, (d) object matte (stencil buffer), (e) difference being image (b) subtracted from image (c), and (f) the final composite.
Figure 9:
Figure 9:
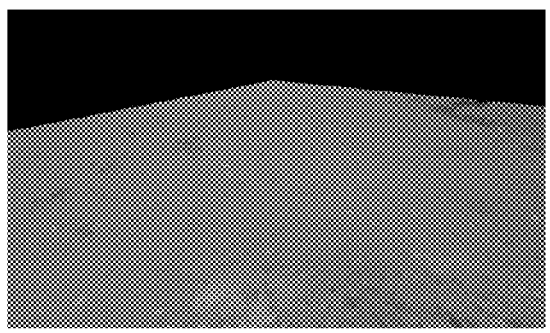
Figure 9:
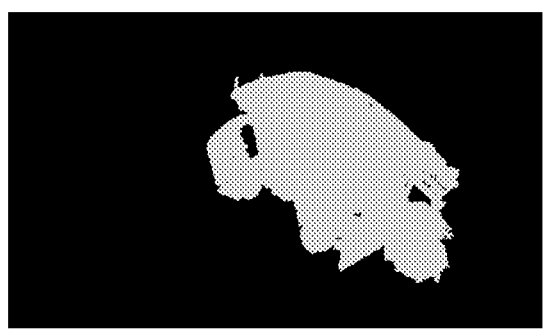
Figure 9:
Figure 9:
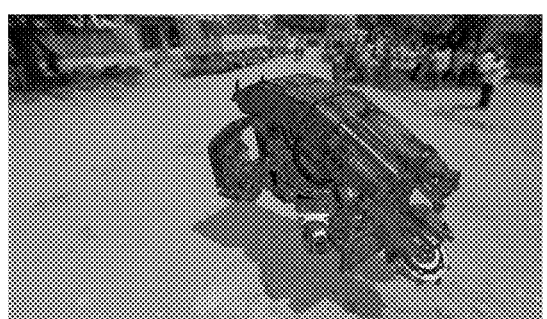
Figure 10:
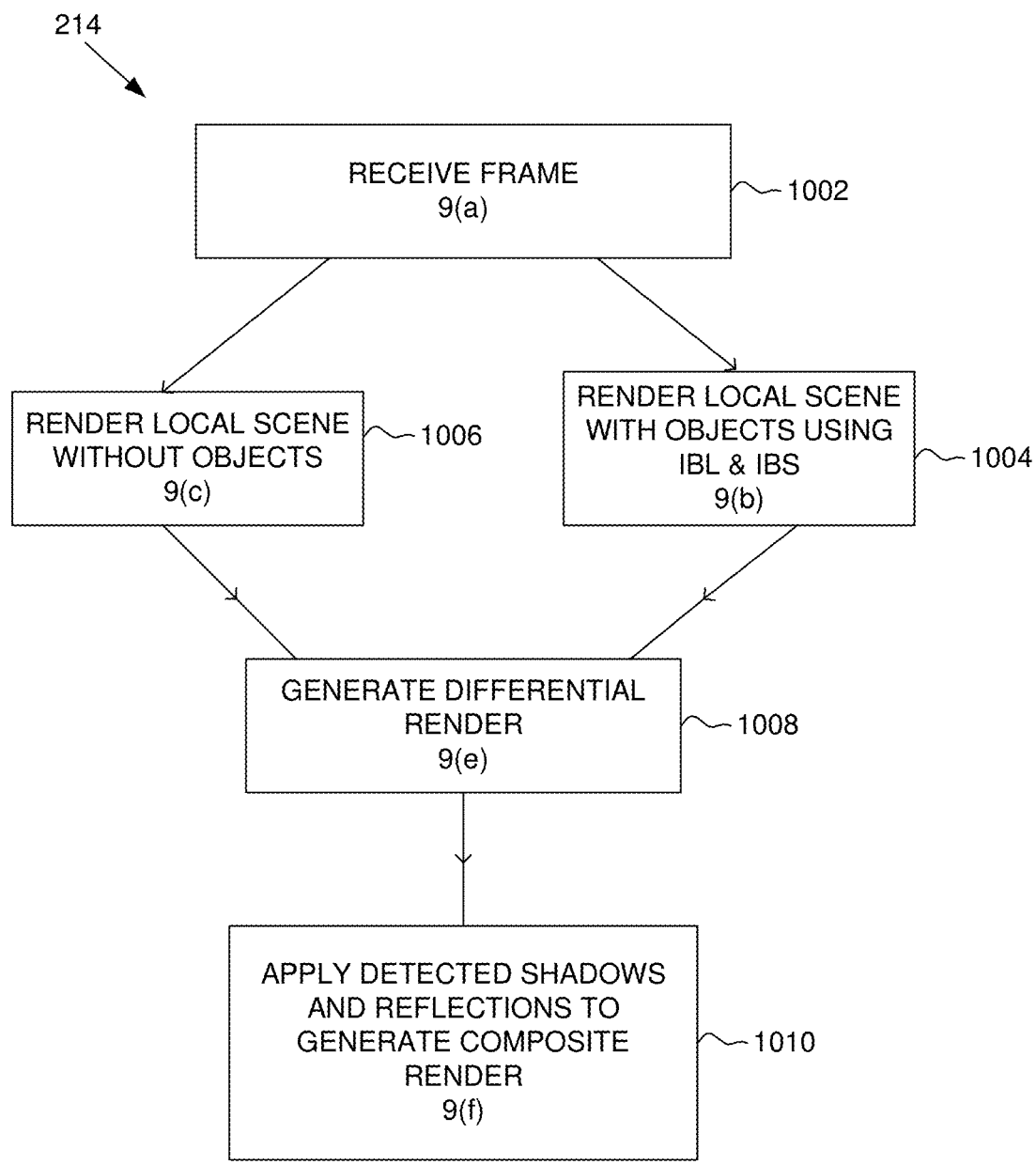
FIG. 10 is a flow diagram of differential rendering and composition of the process.

In MR360, the differential rendering and composition 214, as shown in FIG. 10, is applied in a real-time context to seamlessly composite virtual objects into the 360-video background. This involves processing a frame (step 1002 and FIG. 9(a)) and generating two renders of a local scene: one with objects (step 1004 and FIG. 9(b)), and one without (step 1006 and FIG. 9(c)). The local scene is a piece of geometry representing the compositing surface as shown in FIG. 9c. The first render (1004 and FIG. 9(b)) is generated by adding the objects and using the IBL and IBS processing described above. The second render of only the local scene (FIG. 9(c)) is generated directly from the input background frame (FIG. 9(a)). The object matte (FIG. 9(d)) is used as a mask to remove the virtual objects from the first render before the difference render is generated. The per-pixel difference between the first and second renders is then generated to produce the difference render (step 1008 and FIG. 9(*e*)) which extracts the effect that the objects had on the local scene, such as shadows and reflections as shown in FIG. 9(*e*). The difference render is then applied to the background frame (FIG. 9(*a*)) and the virtual object previously removed using the mask (FIG. 9(*d*)) is returned to the frame to produce the final composite image of the frame (step 1010 and FIG. 9(*f*)). This composition method captures shadows and screen-space reflections in real-time and applies the global illumination effects such as shadows and reflections onto the 360 background (1010) as depicted in FIG. 9(*f*).

Image Based Lighting in UE4

The node based material editing interface of the UE4 engine 170 is used to build the IBL rendering process using GPU shaders. Render-to-texture shaders compute a diffuse radiance map and mipmaps for specular maps; and four levels can be used to cover different roughnesses. Low resolution radiance maps can be computed for perceptually optimised IBL to provide a high frame rate.

The IBL output data is applied to the virtual objects using UE4's post-processing pipeline. Since UE4 170 uses deferred shading, per-pixel properties (e.g. diffuse colour, surface normal, roughness, etc.) can be accessed in the post-processing stage via G-buffers. The IBL output consists of the diffuse component (diffuse radiance map sampled by the surface normal), and the rough specular component (a mipmap of specular radiance maps in different roughness, sampled by the surface reflection vector). Shading the IBL result in a post-process has the benefit of easy integration with pre-made assets and projects in UE4.

Image Based Shadowing in UE4

To facilitate using the detected lights to control UE4 scene properties and to make the implementation of breadth-first search for light detection easier, the system 100 executes the light detection process 212 entirely on the CPU 108. To achieve real-time performance, the process 212 resamples the input frame to a fixed resolution of 600×150 (top half only) before performing light detection.

The Media Framework of the UE4 engine 170 is modified to get access to the raw video frame before it is uploaded to the GPU 114. Light detection 212 is run whenever the video decoder thread delivers a new frame to its target, a Media Texture object. As such, the light detection just has to keep up with the video frame rate and does not affect rendering performance. New properties added to the Media Texture are used to control the light detection and to export the results such that they can be used by a Blueprint visual programming interface in UE4 to update the directional lights in the scene. The detected light's spherical coordinates are used to set the direction of the UE4 light. The detected irradiance is used to set the intensity and colour of the light.

UE4's dynamic shadowing procedure for directional lights is implemented with cascaded shadow maps and percentage closer filtering (PCF). By adjusting the shadow parameters exposed by UE4, its PCF is used to achieve the effect of soft shadows. Controlling the dynamic shadow distance parameter, provides control of the spatial resolution of the shadow map. A lower spatial resolution causes the soft penumbrae produced by PCF to increase in size.

The pipeline linearly maps and clamps light solid angles of [0.1sr; 0.6sr] to shadow distances of [4000 cm, 20000 cm] and linearly maps and clamps the same range of solid angles to cascade distribution exponents of in order to increase shadow detail for smaller lights. The pipeline also reduces the intensity for larger lights which helps to reduce artifacts from a lower shadow resolution.

Differential Rendering in UE4

Differential rendering is modified for high performance real-time mixed reality rendering in the game engine 170 of the system 100. Diffuse and specular local scene reflectance are separately addressed for differential rendering. A diffuse local scene captures shadows and screen-space ambient occlusion (SSAO) from the virtual objects, and a specular local scene captures screen-space reflections (SSR). To meet a high frame rate, the pipeline directly uses the background video as the diffuse colour of the local scene. This grants consistent composition without manual tweaking, and it has the added benefit of automatically adapting to spatial colour variation in the compositing region of the video.

As discussed, the process 214 requires two renders as shown in FIG. 10. The first is of the entire scene including objects and local scene (1004), and the second is of the local scene without objects (1006). If the pipeline only uses a diffuse bidirectional reflectance distribution function (BRDF) for the local scene, the Lambertian colour value can be easily computed in a post process. This allows the difference image (1008) to be generated in the compositing stage, without taking a second render of the scene (local scene without objects).

Stereoscopic Mixed Reality Rendering

To compose stereoscope renderings of 3D virtual objects into a monoscopic 360-video background, stereo 360-video with stereo VR rendering is ideal but 360 stereo-video is expensive and impractical. Mono 360-video with stereo VR rendering, as discussed above is relatively simple approach but has parallax artifact. With input mono 360-video 201 the stereo VR rendering discussed above can be adjusted to obviate the parallax artifact in MR360.

Figure 11:
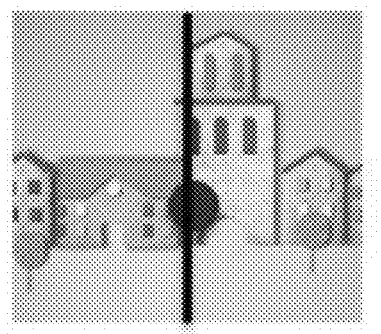
FIG. 11 is a diagram of centre point location for stereoscopic rendering.
Figure 11:
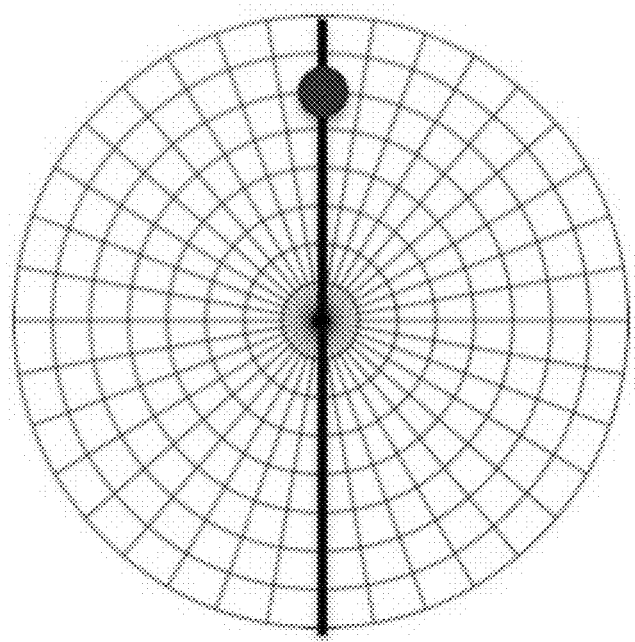
Figure 12:
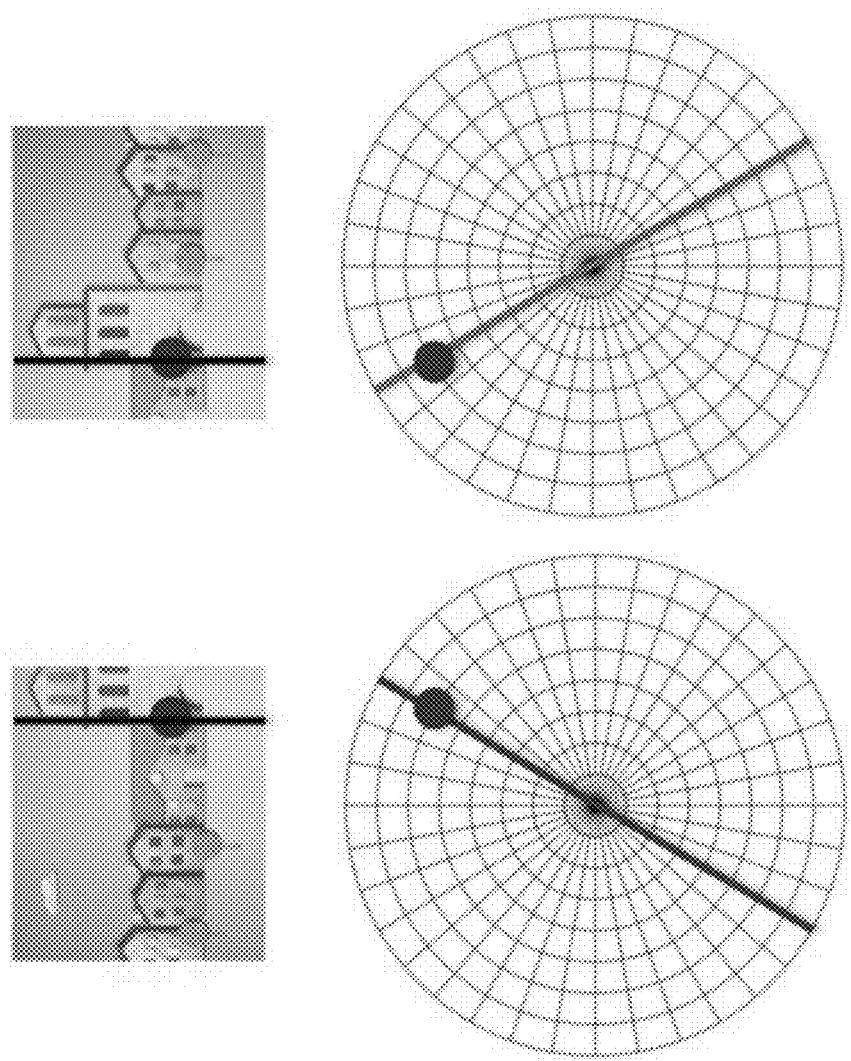
FIG. 12 is diagram of image rotation for each eye to match the centre point for stereoscopic rendering.
Figure 13:
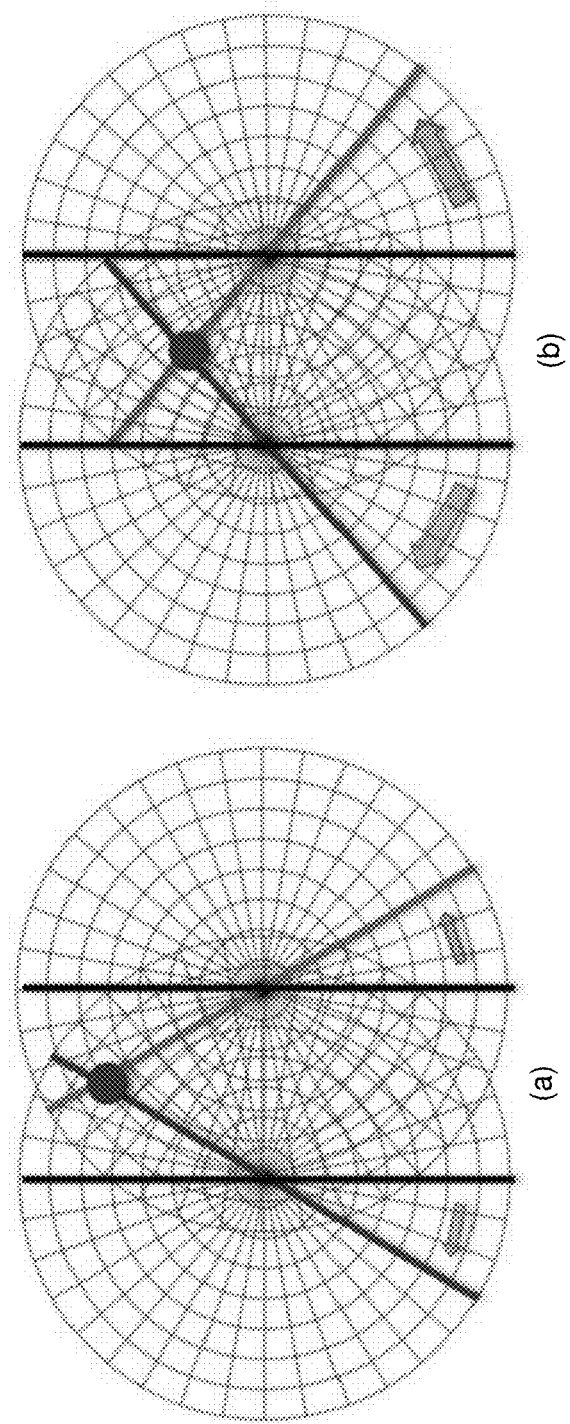
FIG. 13 are diagrams of different image rotation based on object position for stereoscopic rendering.

This is achieved by adjusting the 360-video rotation angle use convergence angle of the rendered virtual object. In mono 360-video and mono VR rendering, the center points (black line) are determined as shown in FIG. 11. For a stereo VR scene, the 360-video is rotated for each eye to match the center points (in AR it is a gaze point or marker position for the virtual object) as shown in FIG. 12. The pipeline 200 adjusts the process by adjusting the rotation depending on the distance of the virtual object from the centre as shown in FIG. 13. A closer object will give rise to more rotation, as shown in FIG. 13(*a*), and far away object will generate less rotation (less parallax btw fore and background, as shown in FIG. 13(*b*)). This is similar to simulating convergence of eyes using rotations.

Synthetic Video

Whilst MR360 allows 360° video to be adapted in real-time, MR360 can also be used with pre-rendered synthetic or offline generated video as the background or lighting source, which may be required for visual special effects (VFX) films and games. This is achieved by first pre-rendering a full 3D synthetic background scene using an omnidirectional virtual camera and saving the result as a 360° video. This 360° video is then used as the lighting source and back drop in the MR360 pipeline during the composition stage and in particular during differential rendering, the 3D virtual objects are rendered onto the 360° video background scene.

Many modifications will be apparent to those skilled in the art without departing from the scope of the present invention as herein described with reference to the accompanying drawings.

The invention claimed is:

1. A rendering process implemented on a computer system,
the computer system comprising at least one processing unit and processing modules to perform the rendering process, the rendering process including:
receiving low dynamic range (LDR) video data;
generating radiance maps from said LDR data, wherein said maps include a diffuse radiance map and a specular radiance map;
inverse tone mapping LDR data of said maps to generate high dynamic range (HDR) data for said maps; and
receiving at least one virtual object and applying image based lighting to said at least one virtual object using said HDR data of said maps.

2. A rendering process implemented on a computer system,
the computer system comprising at least one processing unit and processing modules to perform the rendering process, the rendering process including:
receiving low dynamic range (LDR) video data, wherein the LDR video data is used as a background for differential rendering to composite said at least one virtual object into the background;
generating radiance maps from said LDR data;
inverse tone mapping LDR data of said maps to generate high dynamic range (HDR) data for said maps; and
receiving at least one virtual object and applying image based lighting to said at least one virtual object using said HDR data of said maps.

3. The rendering process as claimed in claim 2, wherein said differential rendering includes generating a first render of a local scene with said at least one object, generating a second render of said local scene without said at least one object, generating a differential render from the first and second renders, and generating a composite render with said at least one object and with lighting and shadowing adjusted based on said differential render.

4. The rendering process as claimed in claim 2, wherein said video data is monoscopic and the process includes stereoscopic rendering said at least one virtual object into said background.

5. The rendering process as claimed in claim 4, wherein said stereoscopic rendering includes rotating a rendered scene relative to a centre gaze point based on the distance of said at least one virtual object to said gaze point.

6. A rendering process implemented on a computer system,
the computer system comprising at least one processing unit and processing modules to perform the rendering process, the rendering process including:
receiving low dynamic range (LDR) video data;
generating radiance maps from said LDR data;
applying a dynamic threshold to said radiance maps to detect prominent pixels;
converting said prominent pixels into directional lights for image based shadowing associated with at least one virtual object;
inverse tone mapping LDR data of said maps to generate high dynamic range (HDR) data for said maps; and
receiving at least one virtual object and applying image based lighting to said at least one virtual object using said HDR data of said maps.

7. The rendering process as claimed in claim 6, wherein said threshold may be applied to the LDR video data, HDR video data, or inverse tone mapped LDR video data.

8. The rendering process as claimed in claim 6, wherein said threshold is applied to the upper half of frame of said radiance map.

9. The rendering process as claimed in claim 6, wherein said threshold is determined for each frame using statistical metrics to produce a perceptually acceptable render.

10. The rendering process as claimed in claim 9, wherein said threshold is determined for each frame of said radiance maps using the mean $\mu$ and variance $\sigma^2$ of the luminance of the pixels of each frame, and the threshold is $\mu+2\sigma$.

11. The rendering process as claimed claim 10, wherein a blur is applied to the pixels before applying said threshold.

12. The rendering process as claimed in claim 11, including selecting said pixels above said threshold and representing a high percentage of the radiance of the respective frame as the detected salient lights for image based shadowing.

13. A rendering process implemented on a computer system,
the computer system comprising at least one processing unit and processing modules to perform the rendering process, the rendering process including:
applying a perceptually based threshold to radiance maps to detect prominent pixels, wherein prominent pixels are detected from the LDR video data, HDR video data, or inverse tone mapped LDR video data and used to provide shadows for real-time differential rendering; and
using said prominent pixels as lights for image based shadowing associated with at least one virtual object.

14. A rendering process implemented on a computer system,
the computer system comprising at least one processing unit and processing modules to perform the rendering process, the rendering process including:
applying a perceptually based threshold to radiance maps to detect prominent pixels, wherein said threshold is applied to the upper half of frame of said radiance map; and
using said prominent pixels as lights for image based shadowing associated with at least one virtual object.

15. A rendering process implemented on a computer system,
the computer system comprising at least one processing unit and processing modules to perform the rendering process, the rendering process including:
applying a perceptually based threshold to radiance maps to detect prominent pixels, wherein said threshold is determined for each frame using statistical metrics to produce a perceptually acceptable render; and
using said prominent pixels as lights for image based shadowing associated with at least one virtual object.

16. The rendering process as claimed in claim 15, wherein said threshold is determined for each frame of said radiance maps using the mean $\mu$ and variance $\sigma^2$ of the luminance of the pixels of each frame, and the threshold is $\mu+2\sigma$.

17. A rendering process implemented on a computer system,
the computer system comprising at least one processing unit and processing modules to perform the rendering process, the rendering process including:
receiving low dynamic range (LDR) video data, wherein said video data represents a panoramic video or 360° video;
generating radiance maps from said LDR data;
inverse tone mapping LDR data of said maps to generate high dynamic range (HDR) data for said maps; and receiving at least one virtual object and applying image based lighting to said at least one virtual object using said HDR data of said maps.

18. A rendering computer system including:
a display;
a graphics processing unit (GPU);
a computer processing unit (CPU); and
processing modules including GPU shaders to provide a pipeline to perform the rendering process as claimed in claim 1.

* * * * *